United States Patent [19]

Hisatake et al.

[11] Patent Number: 5,107,778
[45] Date of Patent: Apr. 28, 1992

[54] AUTOMATIC EMBROIDERING MACHINE AND METHOD

[75] Inventors: Michio Hisatake; Takeshi Kongo; Hidenori Sasako, all of Tokyo, Japan

[73] Assignee: Janome Sewing Machine Co. Ltd., Tokyo, Japan

[21] Appl. No.: 390,182

[22] Filed: Aug. 4, 1989

[30] Foreign Application Priority Data

Aug. 5, 1988 [JP] Japan .................................... 194379

[51] Int. Cl.⁵ ........................ D05B 21/00; D05C 9/04
[52] U.S. Cl. ................... 112/262.3; 112/103; 112/121.12
[58] Field of Search ................... 112/103, 121.12, 102, 112/121.11, 2, 266.1, 262.3

[56] References Cited

U.S. PATENT DOCUMENTS

| | | | |
|---|---|---|---|
| 4,548,142 | 10/1985 | Peck | 112/121.12 |
| 4,763,586 | 8/1988 | Takenoya et al. | 112/121.12 X |
| 4,768,450 | 9/1988 | Kato et al. | 112/121.12 |
| 4,858,542 | 8/1989 | Kato et al. | 112/103 X |

*Primary Examiner*—Peter Nerbun
*Attorney, Agent, or Firm*—Michael J. Striker

[57] ABSTRACT

An automatic embroidering machine comprising a control apparatus which compares a limit line of movement of an embroidering frame to be used prior to starting embrodeiry with a range of a row of selected and stored embroidering letter, nullifies improper operation keys, and indicates by figures appropriate operations of the operation keys.

3 Claims, 5 Drawing Sheets

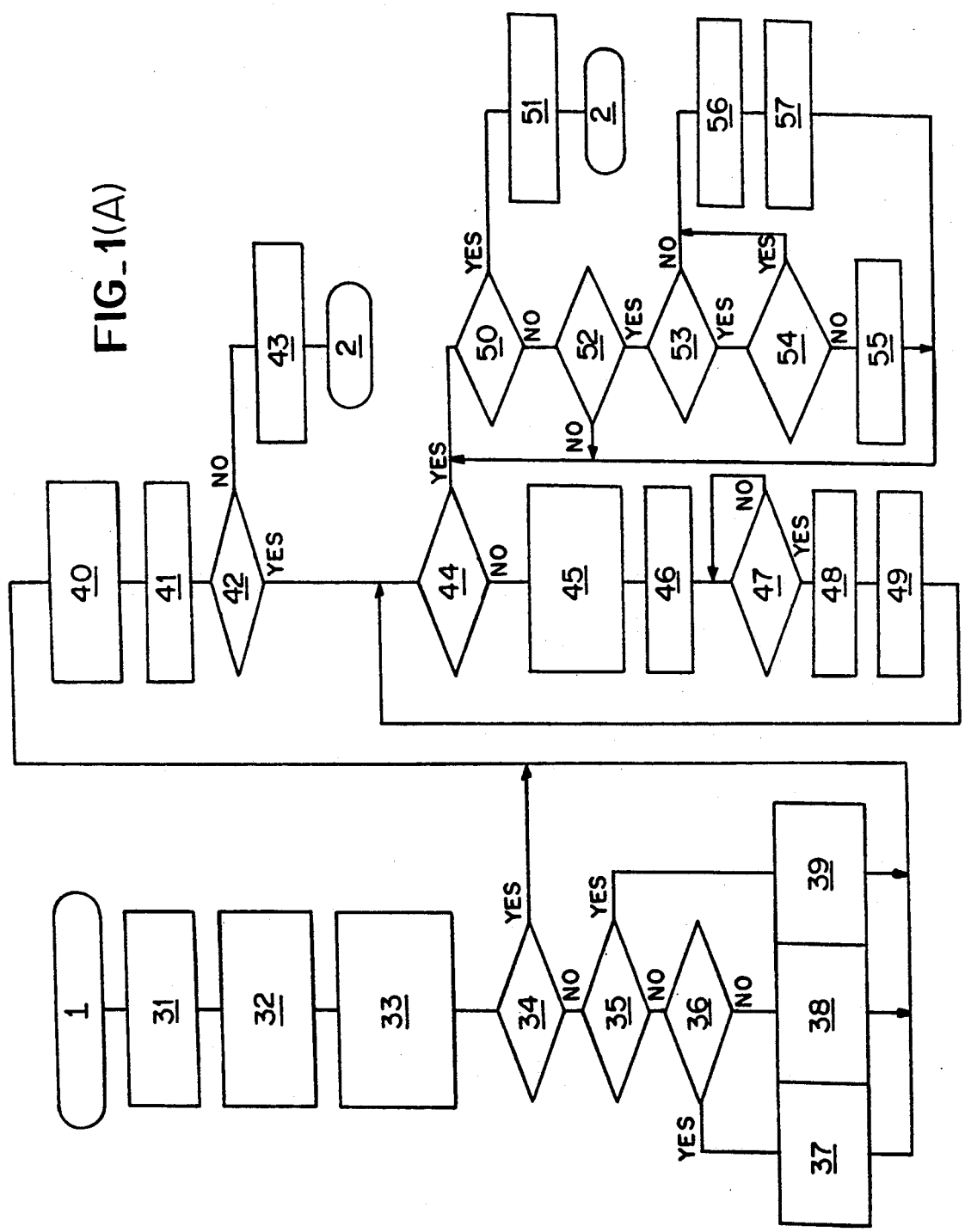
FIG_1(A)

FIG_1(B)

1. Different routines before starting embroidering
2. Finish
31. Obtain embroidering outlined data from selected and stored embroidering lines
32. Refer to the frame moving limit line (FL) from data table of ROM with reference to data for discriminating sorts of the embroidering frame
33. Obtain a range surrounded with dots at left lower corner of a rectangle, when moving the rectangle having sizes of H and L within the frame moving limit lines (FL)
34. 36. Left-Bottom Mode
35. Center-Bottom Mode
37. Move the range on Y-axis by 1/2H
38. Move the range on X-axis by 1/2L and move it to the left-upper side on Y-axis by 1/2H
39. Move the range to right on X-axis by 1/2L
40. Decide the range (TA) of the needle coordinate and its limit line (TL) before the available embroidering
41. Indicate the limit line and the embroidering outline
42. Does (TA) exist ?
43. Nullify a start key and a frame moving key
44. Is the present needle coordinate within the range of (TA) ?
45. Draw a circle around the present needle coordinate and obtain a point Q tangent to the limit line (TL) by means of the minimum radius
46. Nullify the frame moving key remote from the start and the point Q
47. Is the available frame moving key pushed ?
48. 56. Move the frame
49. 57. Indicate the limit line and the embroidering outline after moving the frame
50. Is the start key pushed ?
51. Start the embroidering
52. Is the frame moving key pushed ?
53. Is the present needle coordinate above the (TL)
54. Is the frame moving key a key entering the range (TA)?
55. Ignore the present key input FIG_2
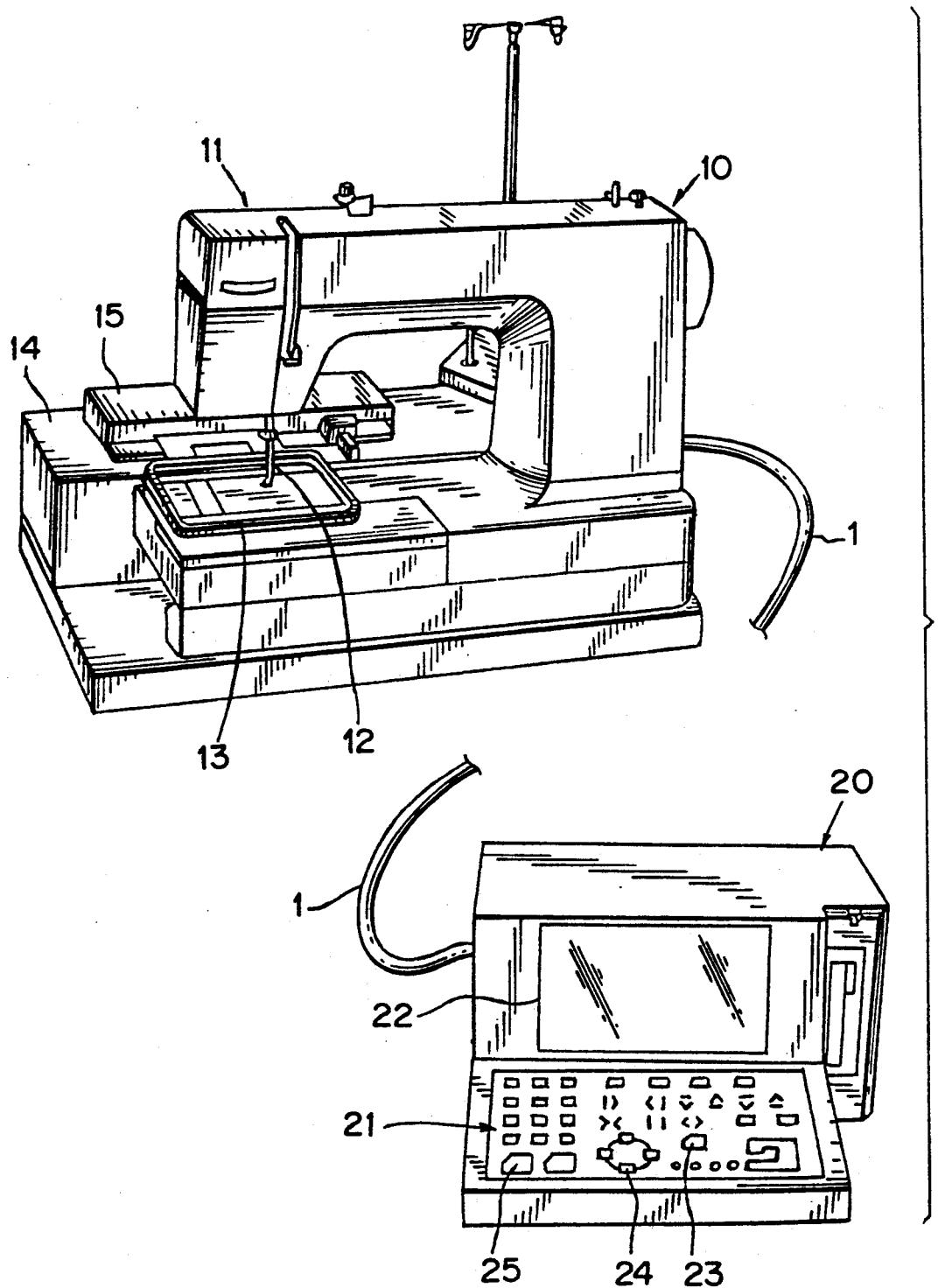

FIG_3
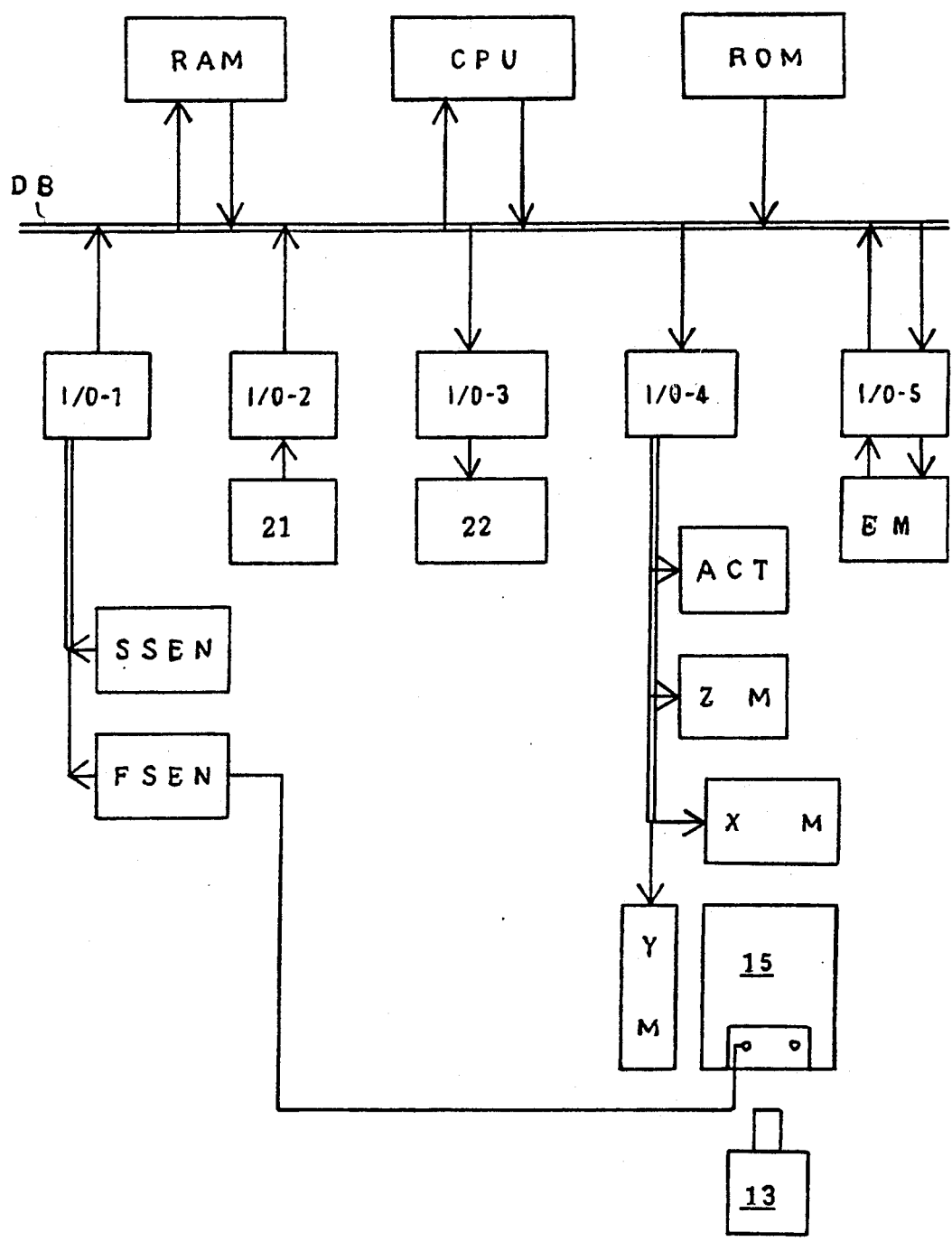

FIG_4
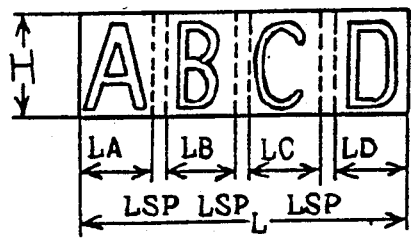
FIG_5
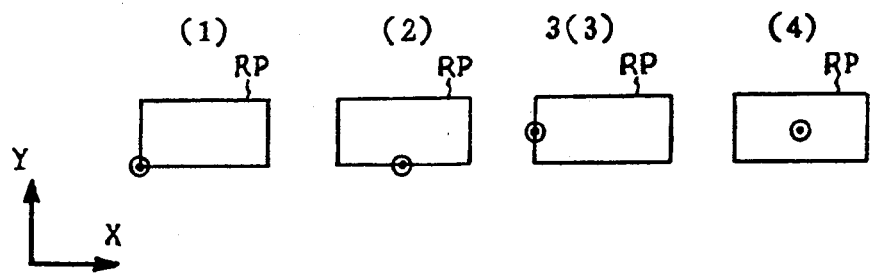
FIG_6
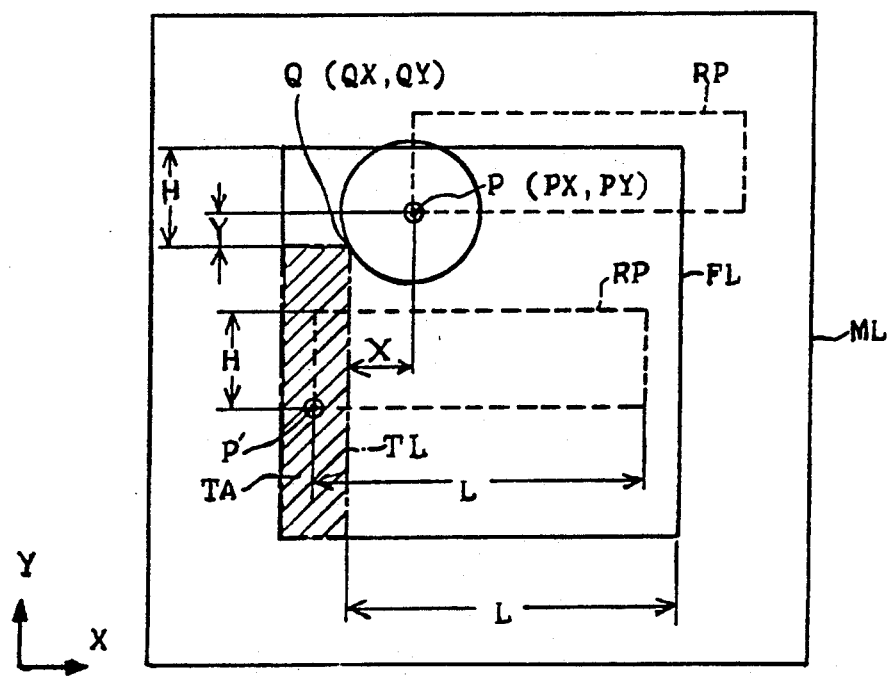

AUTOMATIC EMBROIDERING MACHINE AND METHOD

FIELD OF THE INVENTION

The present invention relates to an automatic embroidering machine which, more particularly, includes means that compares limit lines of movement of an embroidering frame to be used prior to starting of embroidery with embroidering ranges of letters to be stitched, nullifies inappropriate operation keys, and indicates proper operation by figures, thereby enabling the carrying out of an embroidering operation.

BACKGROUND OF THE INVENTION

Prior art discloses an automatic embroidering machine in which, prior to the embroidering operation, the limiting data for moving the frame are read out by discriminating means associated with the embroidering frame whereat a required embroidering range is determined by a current needle coordinate. An embroidering start key is nullified when the data are outside of the area of the embroidering frame, and the embroidering range is larger than the limiting data. The machine includes an indicating devices that produces a warning by a buzzer when the start key is actuated. The drawback of this prior art machine consists in that it was not known to an operator whether the embroidering might be carried out and in which direction, and how much the embroidering frame was moved, and whether it was necessary to reduce the size of the embroidering letters.

Thus, the foregoing machines could not always satisfy the operators.

SUMMARY OF THE INVENTION

The object of the invention is to provide an automatic embroidering machine without drawbacks which are characteristic for prior art embroidering machine. The object of the invention is achieved by providing an embroidering machine comprising range calculation means for calculating the range of the needle coordinates where the embroidering data are available prior to the embroidering operation from data of limit lines of the frame movement obtained with the discriminating means for the embroidering letters, and original stitching mode data. First control means effects nullification of a start key and a frame moving key, when the range of the needle coordinate does not exist. Second control means nullifies a start key, when the present needle coordinate now at hand is outside of the predetermined range and also nullifies keys other than the frame moving key. Third control means makes the start key effective when the present needle coordinate is within the range, and makes all the frame moving keys effective within the range. Indication means indicates by figures the limit lines of moving the frame, the range, the present needle coordinate and the outlined data of the rows of the embroidered letters, and indicates elements for appropriate moving of the frame and calculated results by numerals.

The machine operator may easily obtain the embroidering letters in the embroidering available range.

The present invention both as to its construction so to its mode of operation, together with additional objects and advantages thereof, will be best understood from the following detailed description with reference to the appended drawings.

BRIEF DESCRIPTION OF THE DRAWINGS

FIG. 1A is a flow chart showing respective control steps carried out before the embroidering operation;

FIG. 1B shows definition of steps according to FIG. 1;

FIG. 2 is a perspective view of an automatic embroidering machine;

FIG. 3 is a block-diagram showing the outline of the automatic embroidering machine;

FIG. 4 is an explanatory view for data of the embroidering letters;

FIG. 5 is a view showing positional relations between rectangular patterns by the outlined data of the embroidered letters and the stitching original points; and FIG. 6 is an explanatory view showing respective elements and their control.

DETAILED DESCRIPTION OF PREFERRED EMBODIMENTS OF THE INVENTION

Structure of the automatic embroidering machine

FIG. 2 shows the automatic embroidering machine comprising a sewing machine part 10 and a control part 20 which are connected via a cable 1.

A stitch forming means 11 of the sewing machine part 10 has a needle 12 and a thread loop catching means (not shown) cooperating with the needle. An embroidering frame 13 holding a fabric to be processed is attached to a supporter 15 for displacement by a drive part 14 in X-Y directions in synchronism with movement of the needle. A control part 20 has a key board 21 for designating selections, registrations, moving the embroidering frame, starting and stopping the embroidering operation, and an indication device 22 for indicating pattern arrangements to the operator, motion messages and so on.

The control of the automatic embroidering machine will be discussed with reference the block diagram of FIG. 3.

A central processing unit (CPU) is connected with a read only memory (ROM) for storing a control program via a data base line (DB) and a random access memory (RAM) for storing embroidering data temporally.

The data base line (DB) is connected, via an input-output device (I/O-1), with a sensor (SSEN) for obtaining various data such as phases of a needle bar so as to control the embroidering machine, and a sensor (FSEN) for discriminating types of the embroidering frame 13 supported by the supporter 15. An input-output device (I/O-2) is provided with the key board 21 having operation keys for receiving orders such as selections of embroidering patterns from the operator. An input-output device (I/O-3), with an indicator 22 indicates operating conditions of the operating keys such as the selected embroidering patterns. An input-output device (I/O-4) actuates pulse motors (XM)(YM) for carrying out X-Y displacement of the supporter 15. A machine motor (ZN) drives stitch forming means and an actuator (ACT) such as a solenoid for slacking a thread to embroider the patterns. An input-output device (I/O-5) with an external memory (EM) is used for storing a plurality of embroidering data.

With respect to discriminations of types of the embroidering frame 13, one of the proposals discloses in detail a device for detecting an embroidering frame of an embroidering machine which includes resistor means having a different resistance value per each type of the embroidering frames for measuring voltages at both ends of the embroidering frame connected to the supporter to discriminate the type of the embroidering frames.

Outlined data of the rows of the embroidering letters

Ways for obtaining the outlined data of the rows of the selected and stored embroidering letters will be explained with reference to letters A, B, C, D in FIG. 4.

If the widths of A, B, C, D are designated as LA, LB, LC, LD and their heights are designated as HA, HB, HC, HD (all the heights are the same H), and the distances of the spaces between the letters as LSP, then the length L of the letter row will be $L=LA+LB+LC+LD+3\times LSP$, and H and L will constitute the outlined data of the letter row. Each of modes of stitching original points Each of the modes of the stitching original points will be explained with reference to FIG. 5.

The stitching original point herein is an embroider starting point with respect to the outlined data of the row of the embroidering letters. In FIG. 5, each of the rectangular patterns (RP) shows a pattern by the outlined data (H, L) of the row of the letters, and each of center points of the small circle show the stitching original point. The pattern mode is defined as follows:

(1): Left Bottom Mode
(2): Center-Bottom Mode, where the stitching original point is moved to the right by 1/2L on X-axis with respect to (1).
(3): Left-Middle Mode, where the stitching original point is moved to the upper side by 1/2H on Y-axis with respect to (2).
(4): Center-Middle Mode, where the stitching original point is moved to the right by 1/2L on X-axis with respect to (1), and moved to the upper side by 1/2H on Y-axis.

Each of the modes is selected by a needle key 23 of the key board which selects the embroidering mode. The results thereof are shown with the rectangular patterns (RP) which characterizes the positional relationship.

Elements as related to control

Each of elements as related to control which would be discussed later, will be explained with reference to FIG. 6. The outermost solid line is a limit border line (ML) of a mechanism, and needle dropping points cannot be mechanically moved beyond the limit border line.

An inner solid line (FL) defines a frame of limit border line which may be the same as or smaller than the limit border line (ML). In the present embodiment, the limit border is defined by a square. Others may be a circle, an ellipse and so on. The limit border line (FL) of each frame is stored in the memory (ROM) as individual data or a function corresponding to each of the embroidering frames. The data of the limit border line (FL) for movement of the frame are retrieved from the data table of the memory (ROM) in accordance with the discriminating results of the types of the embroidering frames in dependence upon the discriminating signals communicated from the sensor (FSEN).

A hatched portion limited by a dotted line in FIG. 6 (FIG. 6 is an example of a left-bottom mode), shows, within the limit border line (FL), the range (TA) of the stitching original point when a rectangular pattern (RP) (shown with a dotted line) and defined by the outer shape data (H, L) of the stitched letters, is moved within the limit border line.

The range (TA) is a range of the needle coordinates prior to the embroidering. Since the moving limit (FL) of the frame has a rectangular shape, and the original mode is the left-bottom mode, the range (TA) is defined by a portion obtained by substituting L from the right and H from the upper part within the area surrounded with the limiting line (FL).

The indication device 22 shows the limit line (FL) of the frame, the limit line (TL) of the needle coordinate, the rectangular pattern (RP), and the position (P) of the present needle coordinate.

Control before embroidering

A further discussion will relate to control before effecting the embroidering mainly with reference to FIGS. 1 and 6. Reference numerals in the following explanation will show respective steps of the control.

(31): The embroidering outlined data H, L are obtained from the rows of the selected and stored embroidering letters of A, B, C, D. In the embodiment, the heights of the letters have all the same value (H), and the row length of the letters is LA, LB, LC, LD and $3\times LSP$.

(32): The data of the limit line (FL) for movement of the frame are retrieved from the data table of the memory (ROM) in accordance with the discriminating results of the types of the embroidering frames in dependence upon the discriminating signals generated by the sensor (FSEN). These data are individual data determined by the embroidering frame 1 or a function.

(33): The range at the left and lower corner of the rectangle is obtained when the rectangular pattern (RP) having the sizes H and L is moved within the limit line (FL). The rectangle is not tilted at that time.

(34)(35)(36): The stitching original modes are checked.

(37)(38)(39): The above mentioned ranges are moved, if required, by offset amounts in response to the checked results.

(40): Confirmation is made to the range (TA) of the needle coordinates the available embroidering and the limiting line (TL) thereof.

(41): The indication device 22 shows the limiting line (FL) of frame movement, the limiting line (TL), the rectangular pattern (RP), and the position (P) of the present needle coordinate.

(42): Checking is made to whether the range (TA) exists.

(43): If the range (TA) does not exist, the start key 25 and the frame moving key 24 are nullified.

(44): When the range (TA) exists, the checking is made as to whether the present needle coordinate P (Px, Py) is within the range (TA).

(45): When the range (TA) exists, a circle is drawn around the center of the coordinate P, and a point Q (Qx, Qy) is obtained tangent to the limiting line (TL) with the minimum radius. The position of a frame moving key 24 corresponds to point Q. Point P is spaced from point Q by a distance equal to QX−PX in an X-coordinate direction and QY−PY in a Y-coordinate direction.

(46): Among the frame moving keys 24 including the start key 25 and said plurality of keys, such a frame moving key is nullified in a direction where the point P is remote from the point Q.

(47)(48): Checking is made whether the frame moving effective key is pushed (47), and if it is not pushed, the checking is again made. If it is pushed, the frame is moved to (48).

(49) The indication device 22 shows an indication after moving the frame similarly to the step (41), and the routine is returned to the step (44).

(50): When the present needle coordinate (P') enters the range (TA) as a result of moving the frame, and the start key 25 is pushed, the step (61) controls carrying out the embroidering and its finish.

(52)(53)(54)(55)(56)(57): Steps for moving needle coordinates within the range (TA), and when they reach the limit, the frame moving key is controlled not to be beyond the range.

The indication device 22 shows the elements such as the limit lines and the positions of the needle coordinates. Alternatively, the indication device may show the elements for moving the frame and the calculated results obtained from these elements.

While the invention has been illustrated and described as embodied in an automatic embroidering machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. An automatic embroidering machine comprising stitch forming means including a vertically reciprocating needle and needle thread catching means cooperating with said needle; an embroidering frame for supporting a fabric to be stitched; drive means for moving said embroidering frame in X-Y directions in synchronism with vertical reciprocation of said needle in accordance with embroidering data; means for discriminating types of embroidering frames, said discriminating means including range calculation means for calculating a range of needle coordinates in accordance with first data for defining a limit border of movement of said embroidering frame, said first data being dependent on a type of said embroidering frame, second data for defining an outline of pattern arrangement, and original mode stitching data for optional positioning of the pattern arrangement on the fabric; first control means for nullifying operation of a first key to start said stitch forming means and for nullifying operation of a second key to move said embroidering frame when a calculated range of needle coordinates does not exist; second control means for nullifying operation of said first key when existing needle coordinates are outside of the calculated range of needle coordinates, and for actuating said second key to move said embroidering frame by the shortest distance to the limit border; third control means for actuating said first key when existing needle coordinates are within the calculated range of needle coordinates, and for actuating said second key to move said embroidering frame within the calculated range; and indication means for indicating by figures the limit border of embroidering frame movement, the existing needle coordinates, the outline of the pattern arrangement to be stitched, elements determining appropriate movement of the embroidering frame, and numerical values of results of calculation.

2. A control apparatus for an automatic embroidering machine including stitch forming means including a vertically reciprocating needle and needle thread catching means cooperating with said needle, an embroidering frame for supporting a fabric to be stitched, and drive means for moving the embroidering frame in X-Y directions in synchronism with vertical reciprocation of said needle in accordance with embroidering data, said control apparatus comprising means for discriminating types of embroidering frames, said discriminating means including range calculation means for calculating a range of needle coordinates in accordance with first data for defining a limit border of movement of said embroidering frame, said first data being dependent on a type of said embroidering frame, second data for defining an outline of pattern arrangement, and original mode stitching data for optional positioning of the pattern arrangement on the fabric; first control means for nullifying operation of a first key to start said stitch forming means and for nullifying operation of a second key to move said embroidering frame when a calculated range of needle coordinates does not exist; second control means for nullifying operation of said first key when existing needle coordinates are outside of the calculated range of needle coordinates, and for actuating said second key to move said embroidering frame by the shortest distance to the limit border; third control means for actuating said first key when existing needle coordinates are within the calculated range of needle coordinates, and for actuating said second key to move said embroidering frame within the calculated range; and indication means for indicating by figures the limit border of embroidering frame movement, the existing needle coordinates, the outline of the pattern arrangement to be stitched, elements determining appropriate movement of the embroidering frame, and numerical values of results of calculation.

3. A method of embroidering a pattern comprising the steps of discriminating of types of embroidering frames, said discriminating step including calculating a range of needle coordinates in accordance with first data for defining a limit border of movement of an embroidering frame, said first data being dependent on a type of embroidering frame, second data for defining an outline of pattern arrangement, and original mode stitching data for optional positioning of the pattern arrangement on the fabric; nullifying operation of a first key to start stitching forming means and nullifying operation of a second key to move the embroidering frame when a calculated range of needle coordinates does not exist; nullifying operation of the first key when existing needle coordinates are outside of the calculated range of needle coordinates, and actuating the second key to move the embroidering frame by the shortest distance to the limit border; actuating the first key when existing needle coordinates are within the calculated range of needle coordinates, and actuating the second key to move the embroidering frame within the calculated range; and indicating by figures the limit border of the embroidering frame movement, the existing needle coordinates, the outline of the pattern arrangement to be stitched, elements determining appropriate movement of the embroidering frame, and numerical values of results of calculation.

* * * * *